(12) United States Patent
Chang et al.

(10) Patent No.: US 12,209,863 B2
(45) Date of Patent: Jan. 28, 2025

(54) GEOMAGNETIC POSITIONING DEVICE

(71) Applicant: LUXSHARE-ICT CO., LTD., Taipei (TW)

(72) Inventors: Chih-Hsiung Chang, Taipei (TW); Sheng-Wen Wu, Taipei (TW)

(73) Assignee: LUXSHARE-ICT CO., LTD., Taipei (TW)

( * ) Notice: Subject to any disclaimer, the term of this patent is extended or adjusted under 35 U.S.C. 154(b) by 684 days.

(21) Appl. No.: 17/497,705

(22) Filed: Oct. 8, 2021

(65) Prior Publication Data
US 2022/0364862 A1 Nov. 17, 2022

(30) Foreign Application Priority Data
May 17, 2021 (CN) .......................... 202121047024.4

(51) Int. Cl.
*G01C 17/28* (2006.01)

(52) U.S. Cl.
CPC ................... *G01C 17/28* (2013.01)

(58) Field of Classification Search
CPC .................................................... G01C 17/28
See application file for complete search history.

(56) References Cited

U.S. PATENT DOCUMENTS

| | | | | |
|---|---|---|---|---|
| 3,769,710 A | * | 11/1973 | Reister ............... | G01C 21/1654 244/175 |
| 4,370,815 A | * | 2/1983 | Younkin ............... | G01C 19/34 33/324 |
| 7,877,887 B2 | * | 2/2011 | Watson ............... | G01C 19/5649 33/324 |
| 8,952,682 B2 | * | 2/2015 | Mahan ............... | G01R 33/0023 702/92 |
| 11,624,611 B1 | * | 4/2023 | Vosburgh ............... | G01C 17/28 33/354 |

(Continued)

FOREIGN PATENT DOCUMENTS

| CN | 1816730 B | 9/2010 |
|---|---|---|
| CN | 101208578 B | 12/2010 |

*Primary Examiner* — Yaritza Guadalupe-McCall
(74) *Attorney, Agent, or Firm* — Birch, Stewart, Kolasch & Birch, LLP

(57) ABSTRACT

The present disclosure provides a geomagnetic positioning device, comprising a base assembly and a connecting assembly. The base assembly comprises a control component, a driving component, and a first geomagnetic component. The control component is electrically connected with the driving component and the first geomagnetic component. The connecting assembly is disposed at the driving component and comprises a second geomagnetic component. Wherein the control component obtains the deviation angle of the second geomagnetic component relative to the first geomagnetic component. The control component controls the driving component according to the deviation angle to adjust the relative angle of the connecting assembly relative to the base assembly. Through the reading difference to geomagnetism between the first geomagnetic component and the second geomagnetic component, the relative angle between the control base assembly and the connecting assembly and the absolute angle of the two can be calculated for precise control.

12 Claims, 8 Drawing Sheets

(56) References Cited

U.S. PATENT DOCUMENTS

| | | | |
|---|---|---|---|
| 11,768,073 B1 * | 9/2023 | Vosburgh | G01C 17/28 33/354 |
| 2015/0338215 A1 * | 11/2015 | Srinivasan | G01B 5/24 33/365 |
| 2016/0069681 A1 * | 3/2016 | Johnson | G01C 21/1654 33/356 |
| 2022/0364862 A1 * | 11/2022 | Chang | G01C 17/28 |

* cited by examiner

GEOMAGNETIC POSITIONING DEVICE

CROSS-REFERENCE TO RELATED APPLICATION

This application claims the priority benefit of Chinese Patent Application Serial Number 202121047024.4, filed on May 17, 2021, the full disclosure of which is incorporated herein by reference.

BACKGROUND

Technical Field

The present disclosure relates to the technical field of directional positioning, particularly to a geomagnetic positioning device.

Related Art

In the prior art, a positioning device that detects geomagnetism to calculate an azimuth deviation angle could take a deviation angle between the device and the environment as a reference to control the actual deviation angle of the positioning device after measuring a deviation angle of the device relative to the environmental geomagnetism by the geomagnetic sensor in the positioning device.

Such devices are mostly used for angular positioning in horizontal direction. For further angular positioning in both horizontal and vertical directions, massive and complicated positioning calculations are necessary. However, such further calculations would easy to cause positioning errors.

SUMMARY

The embodiments of the present disclosure provide a geomagnetic positioning device tended to solve the problem of positioning errors caused by massive and complicated positioning calculations at the moment.

The present disclosure provides a geomagnetic positioning device, comprising a base assembly and a connecting assembly. The base assembly comprises a control component, a driving component, and a first geomagnetic component. The control component is electrically connected with the driving component and the first geomagnetic component. The connecting assembly is disposed at the driving component and comprises a second geomagnetic component. Wherein the control component obtains the deviation angle of the second geomagnetic component relative to the first geomagnetic component.

The present disclosure provides a geomagnetic positioning device. According to the reading difference to the geomagnetism between the first geomagnetic component of the base assembly and the second geomagnetic component of the connecting assembly, a relative angle between the base assembly and the connecting assembly and an absolute angle of the two can be calculated, so that relevant computing requirements can be lowered to realize precise control for horizontal and vertical rotation.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
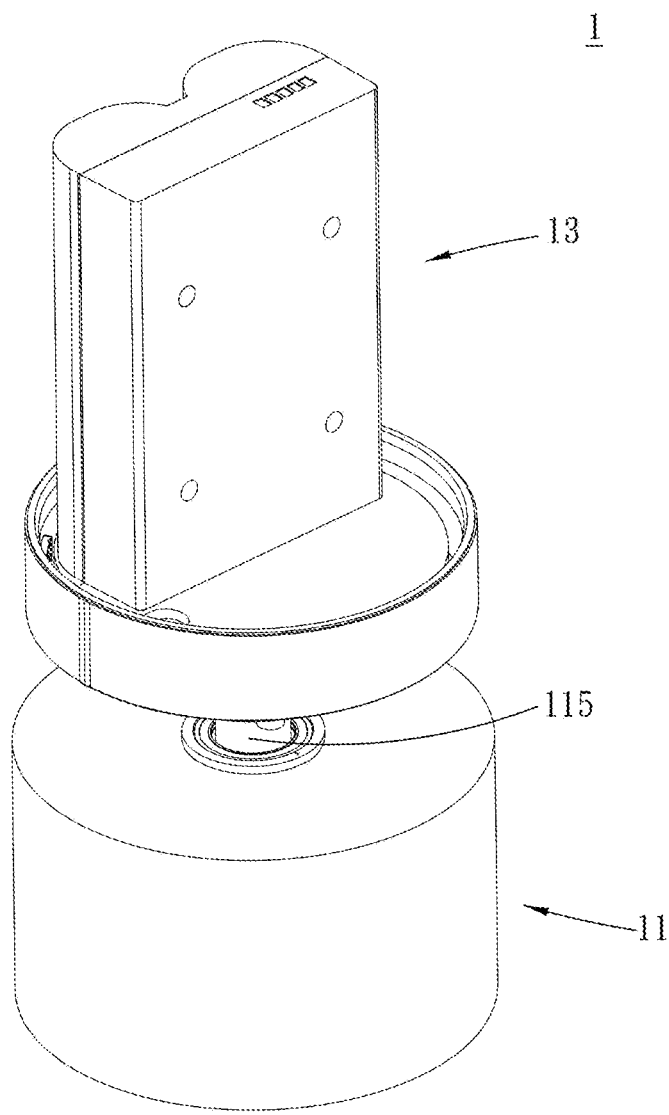
FIG. 1 is a perspective view of a geomagnetic positioning device of the present disclosure.
Figure 2:
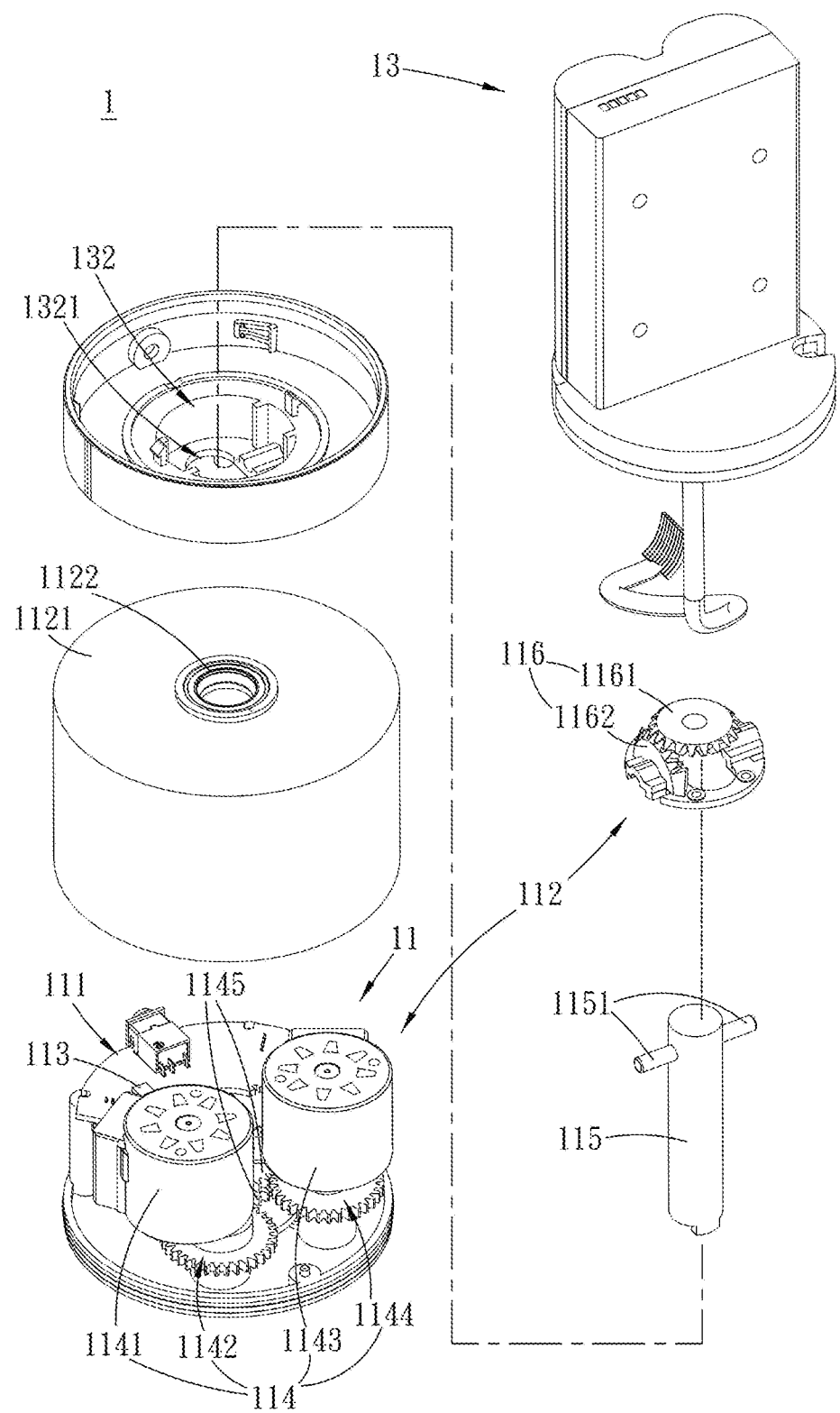
FIG. 2 is an exploded view of the geomagnetic positioning device of the present disclosure.

FIG. 1 and FIG. 2 are perspective view and exploded view of a geomagnetic positioning device of the present disclosure. As shown in the figures, in this embodiment, a geomagnetic positioning device 1 is provided, comprising a base assembly 11 and a connecting assembly 13. The base assembly 11 comprises a control component 111, a driving component 112, and a first geomagnetic component 113. The control component 111 is electrically connected with the driving component 112 and the first geomagnetic component 113. The connecting assembly 13 is disposed at the driving component 112, and the connecting assembly 13 comprises a second geomagnetic component 131. Wherein, the control component 111 obtains the deviation angle of the second geomagnetic component 131 relative to the first geomagnetic component 113, and the control component 111 controls the driving component 112 according to the deviation angle. In this way, the angle of the connecting assembly 13 relative to the base assembly 11 can be adjusted.

Figure 3:
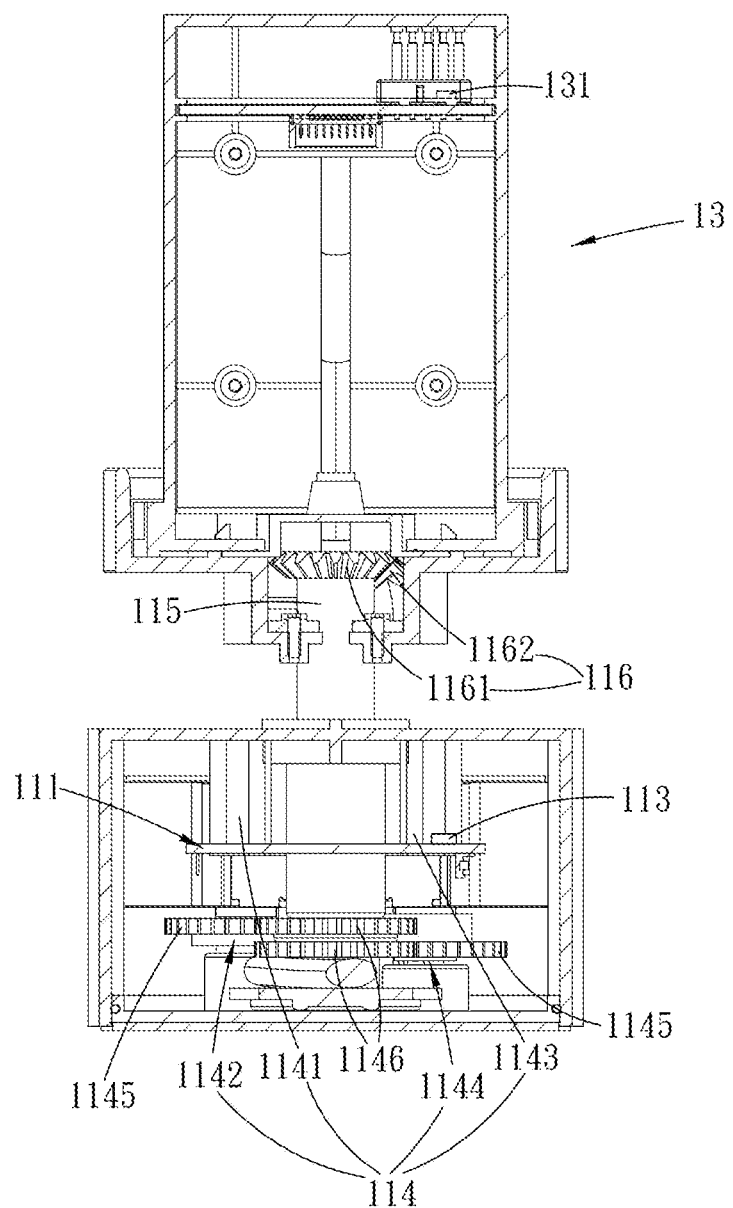
FIG. 3 is a cross-sectional view of the geomagnetic positioning device of the present disclosure.

FIG. 3 is a cross-sectional view of the geomagnetic positioning device of the present disclosure. As shown in the figure, the driving component 112 further comprises a first driving component 114, a central shaft 115, and a second driving component 116. The first driving component 114 is linked to the central shaft 115, the second driving component 116 is rotatably disposed at the central shaft 115, and the connecting assembly 13 is assembled to the second driving component 116. Wherein, the first driving component 114 drives the connecting assembly 13 to rotate in a horizontal direction, and the rotation angle of the horizontal direction is between 180 degrees and minus 180 degrees. The second driving component 116 drives the connecting assembly 13 to offset relative to the inclination direction of the base assembly 11, and the deviation angle of the inclination direction is between 30 degrees and minus 30 degrees.

In this embodiment, the first driving component 114 comprises a first driving member 1141, a first gear group 1142, a second driving member 1143, and a second gear group 1144. The first gear group 1142 is linked to and between the first driving member 1141 and the central shaft 115. The first driving member 1141 and the first gear group 1142 are oppositely disposed at one side of the central shaft 115. The second driving member 1143 and the second gear group 1144 are oppositely disposed at the other side of the central shaft 115. Wherein, the second gear group 1144 is linked to and between the second driving member 1143, and the central shaft 115. The first driving member 1141 drives the first gear group 1142 to drive the central shaft 115 to rotate horizontally in the first direction. The second driving member 1143 drives the second gear group 1144 to drive the central shaft 115 to rotate horizontally in the second direction. The first direction is opposite to the second direction. Besides, both the first gear group 1142 and the second gear group 1144 comprise a driving gear 1145 and a central shaft gear 1146. The first driving member 1141 and the second driving member 1143 are linked to the driving gear 1145. The driving gear 1145 is linked to the central shaft gear 1146, which drives the central shaft 115 to rotate.

Figure 4:
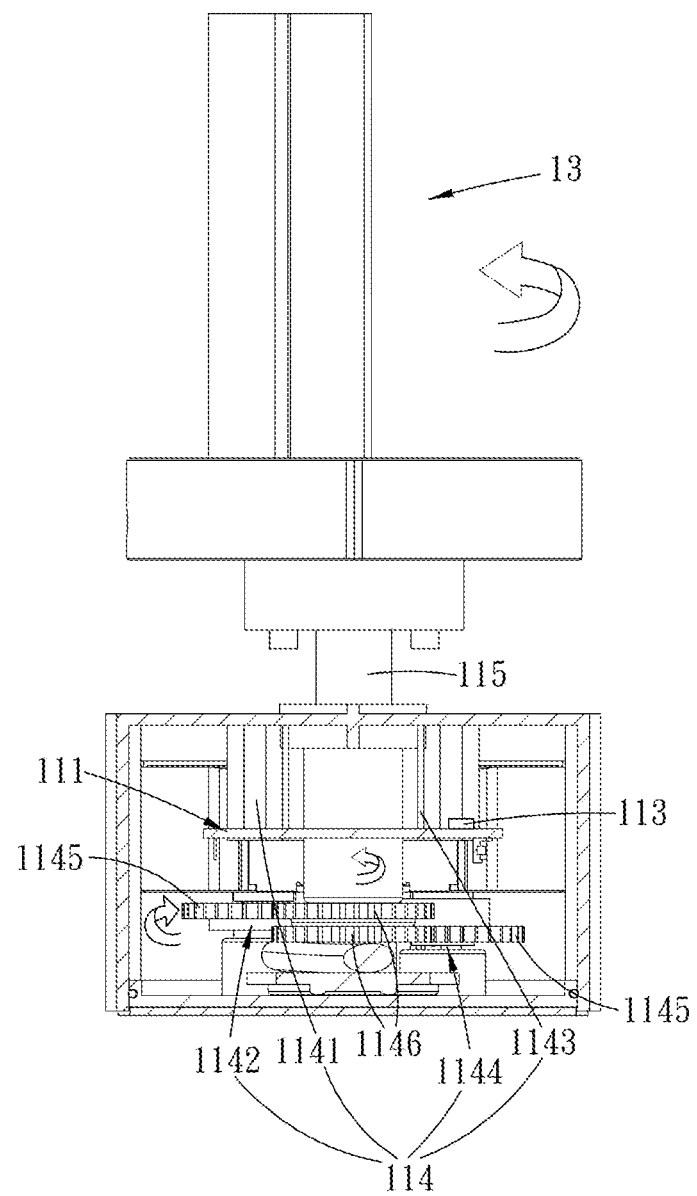
FIG. 4 is a schematic diagram showing a horizontal rotation of the geomagnetic positioning device of the present disclosure.

FIG. 4 is a schematic diagram showing a horizontal rotation of the geomagnetic positioning device of the present disclosure. As shown in the figure, in this embodiment, the first driving member 1141 drives the first gear group 1142, so that the driving gear 1145 of the first gear group 1142 rotates the central shaft gear 1146. The central shaft gear 1146 rotates the central shaft 115 linking with the connecting assembly 13 to rotate in the horizontal direction.

Figure 5:
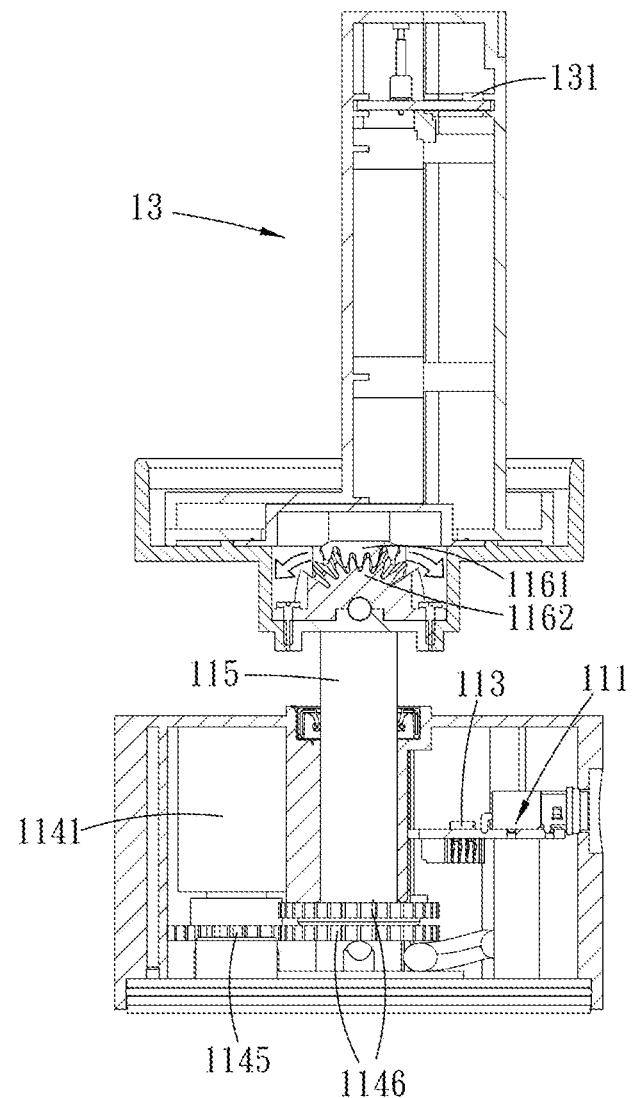
FIG. 5 is another cross-sectional view of the geomagnetic positioning device of the present disclosure.

FIG. 5 is another cross-sectional view of the geomagnetic positioning device of the present disclosure. As shown in the figure, in this embodiment, the second driving component 116 comprises a horizontal gear member 1161 and an inclination gear member 1162. The horizontal gear member 1161 is disposed at the central shaft 115 and is meshed with the inclination gear member 1162, and the connecting assembly 13 is assembled to the inclination gear member 1162. Moreover, the connecting assembly 13 comprises a connecting base 132 comprising a hollow part 1321 through which the central shaft 115 passes. The second driving component 116 is disposed in the connecting assembly 13. Besides, inclination gear member 1162 is disposed at the connecting base 132. A pivoting hole is formed between the inclination gear member 1162 and the connecting base 132. Two sides of the central shaft 115 are respectively provided with a pivoting boss 115. Wherein, the pivoting boss 1151 is disposed in the connecting assembly 13 and is pivotally fixed between the connecting base 132 and the inclination gear member 1162, which indicates that the pivoting boss 1151 is inserted in the pivoting hole. The inclination gear member 1162 and the connecting base 132 rotate in a vertical direction relative to the pivoting boss 1151.

Figure 6:
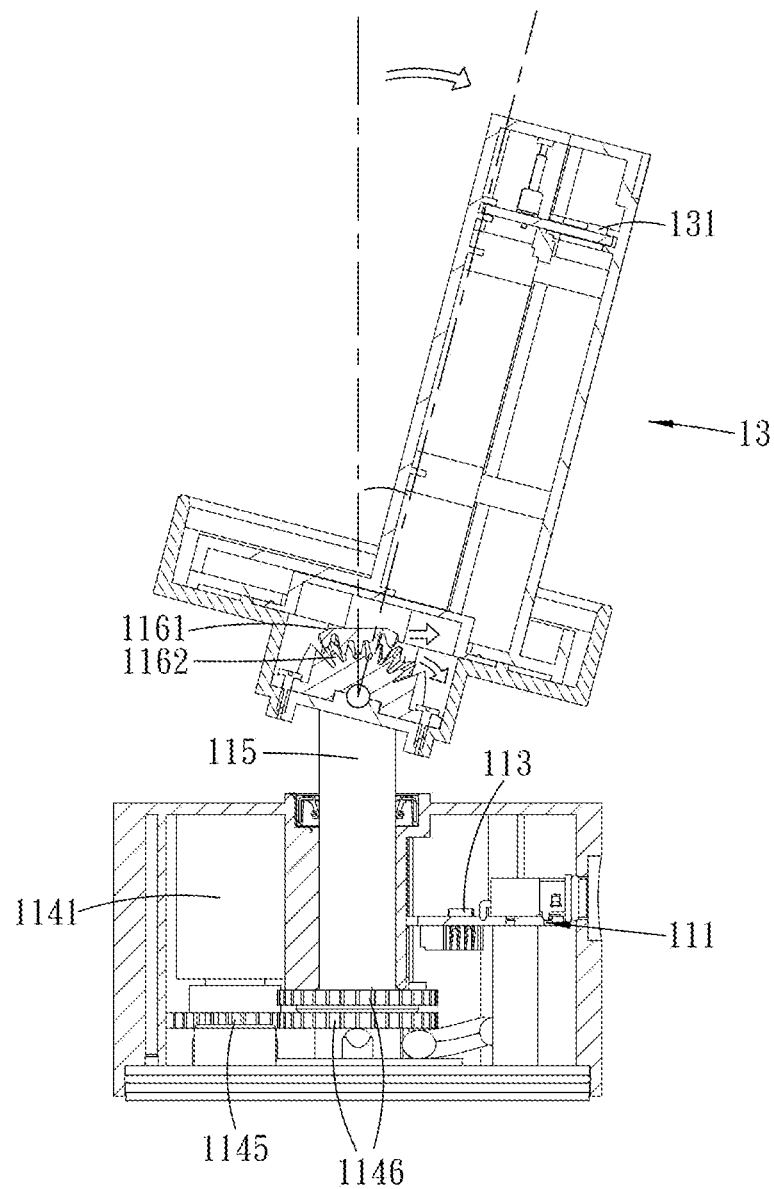
FIG. 6 is a schematic diagram showing a vertical rotation of the geomagnetic positioning device of the present disclosure.

FIG. 6 is a schematic diagram showing a vertical rotation of the geomagnetic positioning device of the present disclosure. As shown in the figure, in this embodiment, the horizontal gear member 1161 rotates horizontally to drive the inclination gear member 1162, and the inclination gear member 1162 links to the connecting assembly 13 to deflect vertically by taking the pivoting boss 1151 as a reference.

In this embodiment, the geomagnetic positioning device 1 can be considered as a positioning control device for other controlled devices, such as a camera lens. The first geomagnetic component 113 of the base assembly 11 could detect the values of X, Y, and Z relative to the geomagnetic deflection, and the second geomagnetic component 131 of the connecting assembly 13 could detect the values of X, Y, and Z relative to the geomagnetic deflection. When the above X, Y, and Z values are taken into account for angle calculation, the control component 111 would control the driving component 112 according to the calculated deviation angle. Thus, the relative angle of the connecting assembly 13 relative to the base assembly 11 can be adjusted.

Referring to FIG. 2 again, in this embodiment, the base assembly 11 further comprises a housing 1121 and a pivoting member 1122. The control component 111, the driving component 112, and the first geomagnetic component 113 are disposed in the housing 1121. The pivoting member 1122 is rotatably disposed at the housing 1121. The central shaft 115 penetrates and is disposed in the pivoting member 1122. In this embodiment, the housing 1121 can protect the control component 111, the driving component 112, the first geomagnetic component 113, etc.

Figure 7:
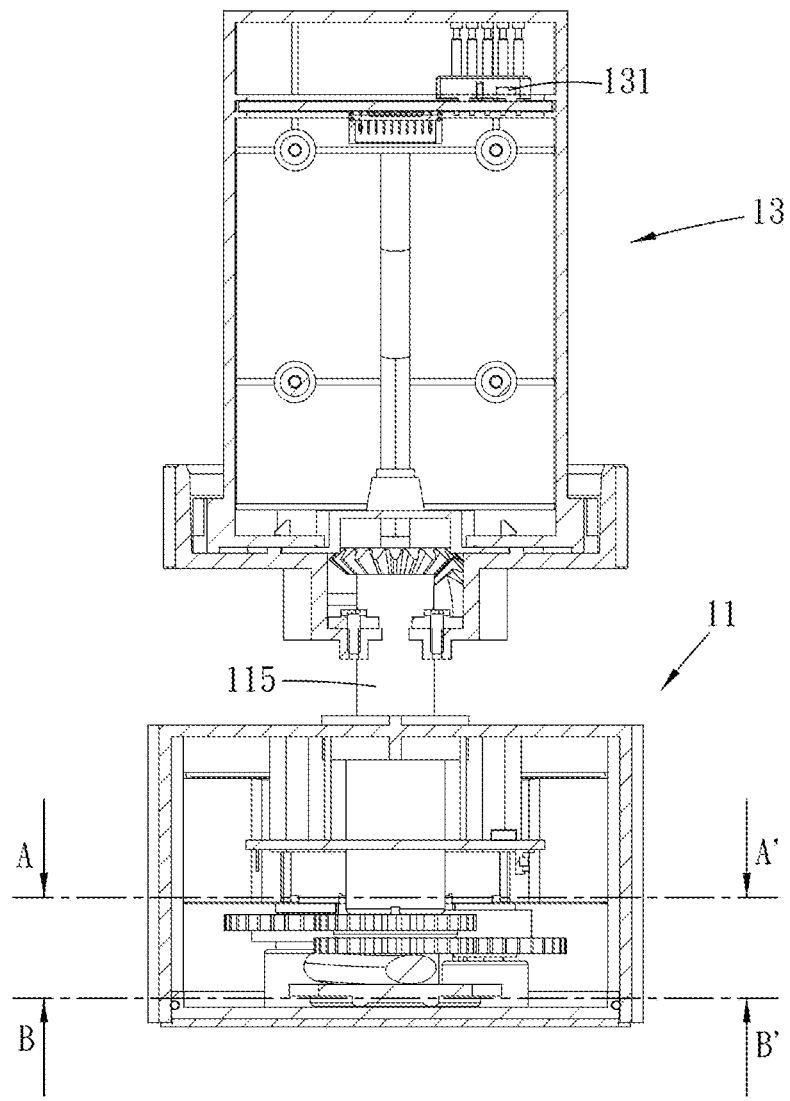
FIG. 7 is a cross-sectional view of the geomagnetic positioning device of another embodiment of the present disclosure.
Figure 8:
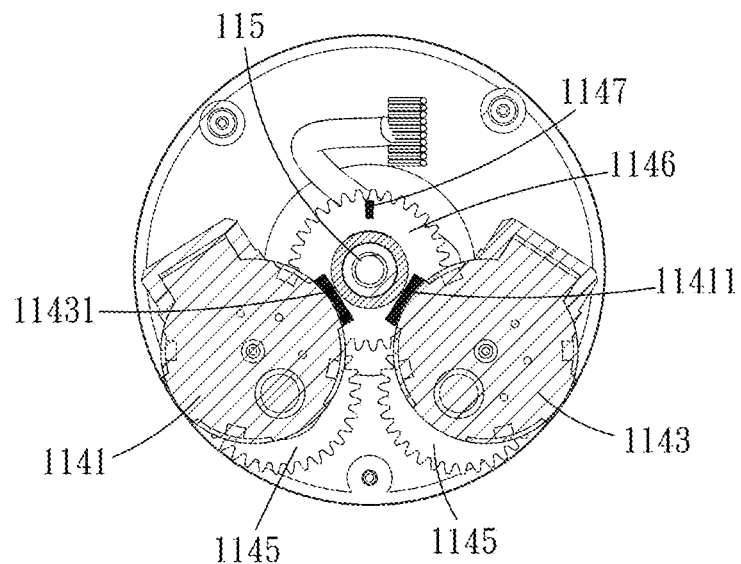
FIG. 8 is a cross-sectional view along line A-A' of FIG. 7.

FIG. 7 is a cross-sectional view of the geomagnetic positioning device of another embodiment of the present disclosure. FIG. 8 is a cross-sectional view along line A-A' of FIG. 7. As shown in the figure, in this embodiment, The first gear group 1142 or the second gear group 1144 further comprises a bump 1147, which is disposed at central shaft gear 1146. The first driving member 1141 comprises a first restricting member 11411, and the second driving member 1143 comprises a second restricting member 11431. The central shaft gear 1146 drives the bump 1147 to rotate. The bump 1147 rotatably abuts against the first restricting member 11411 or the second restricting member 11431. In other words, the first restricting member 11411 and the second restricting member 11431 are disposed on the rotation path of the bump 1147. So, when the central shaft gear 1146 drives the central shaft 115 to rotate, the rotation of the central shaft gear 1146 would be restricted by the rotation of the bump 1147 relative to the first restricting member 11411 and the second restricting member 11431. Thus, the rotation angle of the central shaft gear 1146 is considered as the rotation angle of the central shaft 115.

Figure 9:
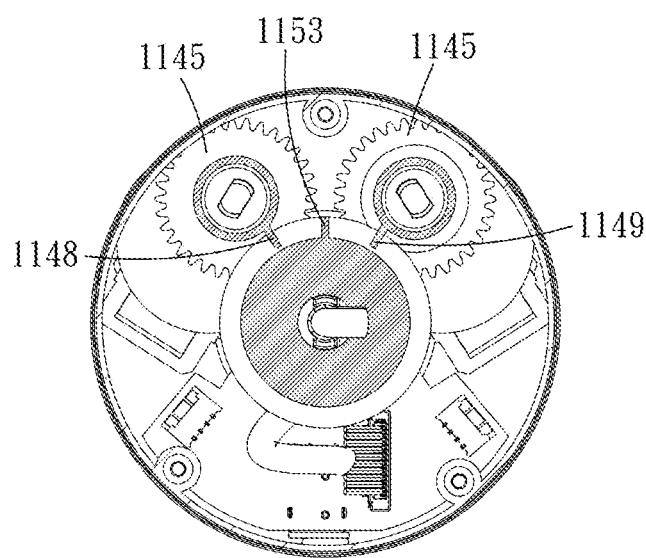
FIG. 9 is a cross-sectional view along line B-B' of FIG. 7.

FIG. 9 is a cross-sectional view along line B-B' of FIG. As shown in the figure, in this embodiment, the first driving component 114 comprises a first limiting member 1148 and a second limiting member 1149. The first limiting member 1148 is disposed at the bottom of the first driving member 1141, and the second limiting member 1149 is disposed at the bottom of the second driving member 1143. The bottom of the central shaft 115 comprises a rotation limiting member 1153. The central shaft 115 drives the rotation limiting member 1153 to rotate, and the rotation limiting member 1153 rotatably abuts against the first limiting member 1148 or the second limiting member 1149. In this embodiment, the limited rotation angle of the rotation limiting member 1153 relative to the first limiter 1148 or the second limiter 1149 is also taken as the rotation angle for the horizontal rotation of the central shaft 115.

In summary, embodiments of the present disclosure provide a geomagnetic positioning device. According to the reading difference to the geomagnetism between the first geomagnetic component of the base assembly and the second geomagnetic component of the connecting assembly, a relative angle between the base assembly and the connecting assembly and an absolute angle of the two can be calculated, so that relevant computing requirements can be lowered to realize precise control for horizontal and vertical rotation.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A geomagnetic positioning device, comprising:
a base assembly comprising a control component, a driving component, and a first geomagnetic component, the control component being electrically connected with the driving component and the first geomagnetic component, wherein the driving component further comprise a first driving component, and a central shaft, the first driving component is linked with the central shaft, the first driving component comprise a first driving member, a first gear group, a second driving member, and a second gear group, the first gear group is linked with and between the first driving member and the central shaft, the second gear group is linked with and between the second driving member and the central shaft, the first driving member drives the first gear group to drive the central shaft to rotate horizontally in a first direction, the second driving member drives the second gear group to drive the central shaft to rotate horizontally in a second direction, and the first direction is opposite to the second direction;
a connecting assembly disposed at the driving component and comprising a second geomagnetic component;
wherein the control component obtains the deviation angle of the second geomagnetic component relative to the first geomagnetic component.

2. The geomagnetic positioning device according to claim 1, wherein the control component controls the driving component according to the deviation angle to adjust the relative angle of the connecting assembly relative to the base assembly.

3. The geomagnetic positioning device according to claim 2, wherein the driving component further comprises a second driving component; the second driving component is rotatably disposed at the central shaft; the connecting assembly is assembled to the second driving component.

4. The geomagnetic positioning device according to claim 3, wherein the first driving component drives the connecting assembly to rotate in a horizontal direction; the rotation angle in the horizontal direction is between 180 degrees and minus 180 degrees.

5. The geomagnetic positioning device according to claim 4, wherein both the first gear group and the second gear group comprise a driving gear and a central shaft gear; the first driving member and the second driving member are linked to the driving gear; the driving gear is linked to the bottom central shaft gear; the central shaft gear drives the central shaft to rotate.

6. The geomagnetic positioning device according to claim 5, wherein the first gear group or the second gear group comprises a bump disposed in the central shaft gear; the first driving member comprises a first restricting member; the second driving member comprises a second restricting member; the central shaft gear drives the bump to rotate; the bump rotatably abut against the first restricting member or the second restricting member.

7. The geomagnetic positioning device according to claim 4, wherein the first driving component comprises a first limiting member and a second limiting member; the first limiting member is disposed at the bottom of the first driving member; the second limiting member is disposed at the bottom of the first driving member; the bottom of the central shaft is provided with a rotation limiting member; the central shaft drives the rotation limiting member to rotate; the rotation limiting member rotatably abuts against the first limiting member or the second limiting member.

8. The geomagnetic positioning device according to claim 3, wherein the second driving component drives the connecting assembly to deviate in an inclination direction relative to the base assembly; the deviation angle of the inclination is between 30 degrees and minus 30 degrees.

9. The geomagnetic positioning device according to claim 8, wherein the second driving component comprises a horizontal gear member and an inclination gear member; the horizontal gear member is disposed at the central shaft; the horizontal gear member meshes with the inclination gear member; the connecting assembly is assembled to the inclination gear member.

10. The geomagnetic positioning device according to claim 9, wherein the connecting assembly comprises a connecting base; the connecting base comprises a hollow part; the central shaft passes through the hollow part; the second driving component is disposed in the connecting assembly.

11. The geomagnetic positioning device according to claim 10, wherein the inclination gear member is disposed at the connecting base; the central shaft comprises a pivoting boss; wherein the pivoting boss is disposed in the connecting assembly; the pivoting boss is pivotally fixed between the connecting base and the inclination gear member.

12. The geomagnetic positioning device according to claim 3, wherein the base assembly comprises a housing and a pivoting member; the control component, the driving component, and the first geomagnetic component are disposed in the housing; the pivoting member is rotatably disposed at the housing; the central shaft passes through the pivoting member.

* * * * *